(12) United States Patent
Trankina et al.

(10) Patent No.: US 6,578,016 B1
(45) Date of Patent: Jun. 10, 2003

(54) TAX ADVANTAGED TRANSACTION STRUCTURE (TATS) AND METHOD

(76) Inventors: Timothy Joseph Trankina, 110 Nature Mill Ct., Alpharetta, GA (US) 30022; James Dominic Terlizzi, 750 Pine Chase Ct., Wellington, FL (US) 33414

(*) Notice: Subject to any disclaimer, the term of this patent is extended or adjusted under 35 U.S.C. 154(b) by 0 days.

(21) Appl. No.: 09/475,826

(22) Filed: Dec. 30, 1999

(51) Int. Cl.[7] ............................................. G06F 17/60
(52) U.S. Cl. ...................................................... 705/39
(58) Field of Search .......................................... 705/39

(56) References Cited

U.S. PATENT DOCUMENTS

| | | | |
|---|---|---|---|
| 4,774,663 A | * | 9/1988 | Musmanno et al. ........ 364/408 |
| 5,809,484 A | * | 9/1998 | Mottola et al. ............. 705/38 |

FOREIGN PATENT DOCUMENTS

| | | | |
|---|---|---|---|
| JP | 2001-312585 | * | 11/2001 |

OTHER PUBLICATIONS

Nonqualified deferred compensation, by William J Dunn, and Moshe Feuer, CPA Journal, v64n9, pp. 46–51, Sep. 1994.*
Ins and Outs of Recourse Agreements, by Terry J. Winders, Commercial Lending Review, v7n2, pp. 79–83, Spring 1992.*

* cited by examiner

*Primary Examiner*—Kenneth R. Rice
(74) *Attorney, Agent, or Firm*—Foley & Lardner

(57) ABSTRACT

A tax advantage transaction structure (TATS) and method directs that a first entity assigns disposable property it owns to a second entity in exchange for a contingent installment obligation. The disposable property is further assigned by the second entity to a third entity in exchange for monetary proceeds. Second entity then causes an investment manager to invest the monetary proceeds in an investment portfolio containing financial securities selected by the first entity. Returns on the investment portfolio are transferred to the second entity and are thereafter paid to first entity in periodic installments in satisfaction of the contingent installment obligation.

46 Claims, 11 Drawing Sheets

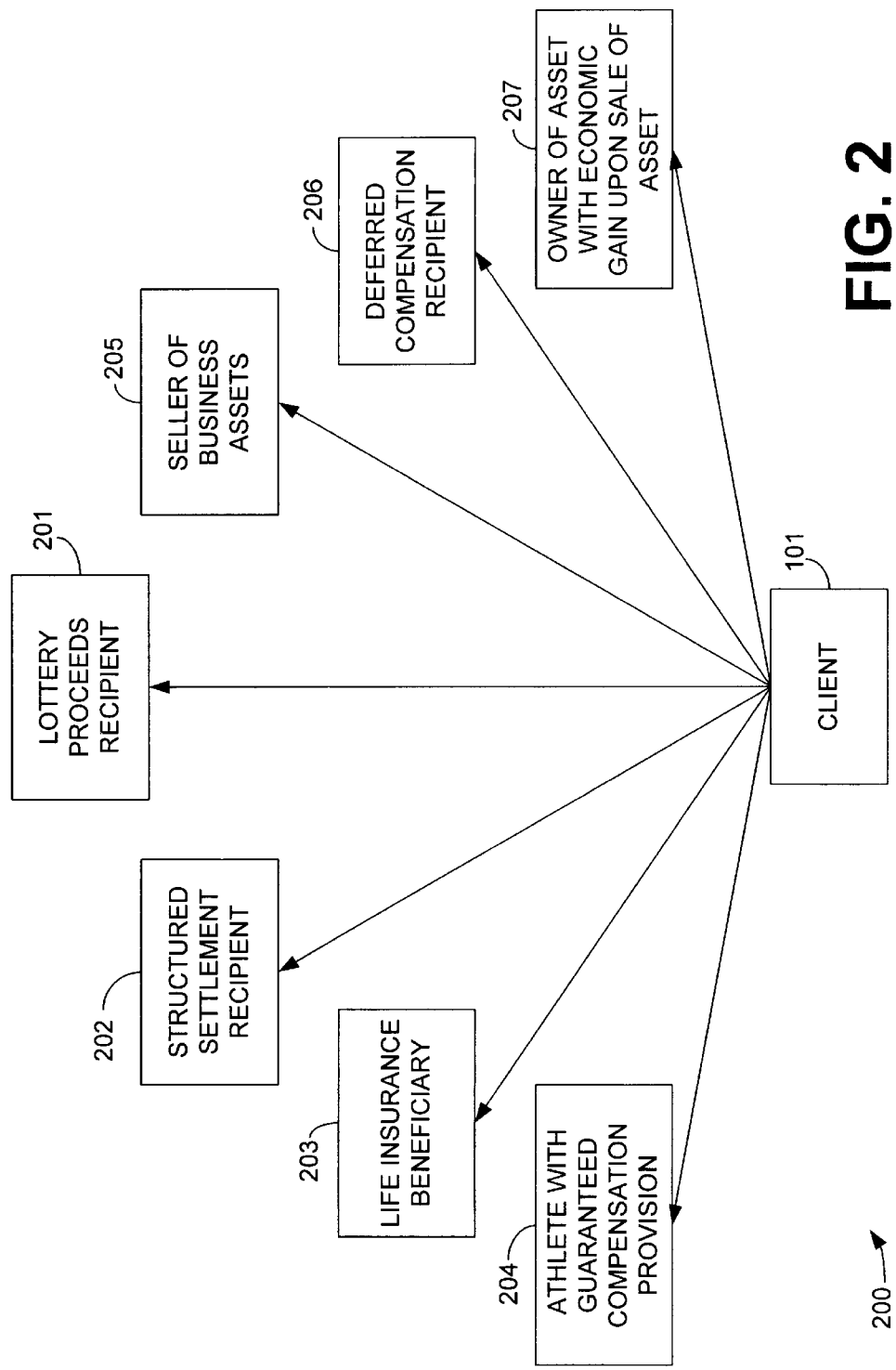

TAX ADVANTAGED TRANSACTION STRUCTURE (TATS) AND METHOD

BACKGROUND OF THE INVENTION

I. Field of the Invention

The invention generally relates to the field of financial investing, and, more specifically, to a tax advantaged transaction structure and method for investing future receivables and other assets with ascertainable economic gain.

II. Description of the Related Art

People have historically sought ways to obtain a combination of a higher rate of return, while also decreasing the risks on their investments. Traditional sources of investment capital have recently given way to new concepts of property that can be bought, sold, and invested to realize a profit. The holders of these new concepts of property desire to 1) diversify their investment in a manner designed to produce a greater overall rate return; 2) reduce risk of loss associated with having their funds invested with only a single obligor or in a single asset; 3) alter the timing of their existing payment stream which may be inflexible and incongruent with their current economic needs; and 4) accomplish these desires in a manner that results in a deferral tax. These desires represent fundamental investment objectives sought by ordinary investors; however, the holders of the new concepts of property are deprived of these fundamental investment objectives due to the peculiarities of the property they hold and the heretofore available techniques for disposing of such assets.

One example of a new resource for investing has arisen from what is known as the structured settlement. Each year more and more people are receiving structured settlements as a result of compensation for tort injuries. Historically, tortfeasors paid damages as a lump sum to the claimant, but recent trends have shifted compensation to tort victims to a periodic schedule. This phenomena has been magnified by the insurance industry that receives federal tax incentives for establishing structured settlement arrangements with tort victims as opposed to lump sum settlements. It is commonplace for insurance companies to shift the payment obligation to a related but third party corporation. The related corporation then purchases a commercial insurance annuity often from a related insurance company that will make periodic payments to the tort victim based on a fixed schedule, as well as pay a nominal rate of interest that is frequently less than 5%. The initial principal of the annuity is a fraction of the original settlement amount, but interest earned on the annuity over the settlement payment period generates the remainder of the future payments due. In effect, the tort victim is making a low interest loan to the insurance company. The insurance company is then enabled to invest the funds of the annuity in more profitable investments and realize a profit in the difference between the annuity percentage that they must pay to the tort victim and the actual return on the annuity investment. Thus, insurance companies have a vested interest in promoting structured settlements for tort victims.

Unfortunately, the tort victim or claimant who is to receive the settlement is locked into a rigid payment scheme over a fixed number of years and receives a nominal rate of interest over the life of the annuity. For example, suppose a tort victim was awarded damages totaling $100,000. If the tort victim accepts a lump sum payment, the insurance company must immediately outlay the entire $100,000 of its own money payable to the tort victim. However, if the tort victim is to receive the money in a structured settlement directing payment of $10,000 a year for ten years, the insurance company will not have to outlay $100,000 of its own money. Instead, the insurance company can establish an annuity and make a one time initial principal deposit into the annuity that is a fraction of the total settlement amount. By reducing the $100,000 to a present value amount and relying on the generated interest to create the difference between the present value and the $100,000 amount, the insurance company only actually outlays a percentage of the entire settlement. Thus, the tort victim not only has to wait to receive payments over the life of the structured settlement, but the tort claimant is also penalized by inflation on the future payments since the value of the future payments will be less than any previous payment. Moreover, the tort claimant effectively has no diversification in the investment such that the tort claimant may earn a greater rate of return than the fixed nominal rate of interest on the annuity; the tort claimant has 100% of her investment at risk with a single obligor; and her payment schedule is fixed and inflexible for a period of years, often in excess of twenty years.

Another recent investment opportunity has arisen in the form of lottery payments. Similar to the structured settlements, a lottery recipient receives a fixed amount of money each year over a set period of years. When a person wins a lottery, the organization that is to pay the lottery—usually a state government—establishes an annuity to satisfy its obligation to make the future lottery payments. The state initially invests a fraction of the total winnings into an annuity and relies on a nominal interest rate return to satisfy the future prize payments. State governments purchase commercial insurance annuities or treasury bonds, either of which earn a low percentage rate. Thus, the lottery winner's prize is effectively invested in a single asset earning an extremely conservative rate of return. The lottery winner's rate of return could be significantly improved with a diversified investment portfolio composed of various investments generating yields greater than that achievable from a 100% investment in a single annuity with a single obligor.

Many lottery winners recognize that they could achieve greater diversification and greater rates of return on their lottery winnings if they were able to receive their lottery winnings in a single lump sum as opposed to the periodic payments. In accommodation, many states, as well as third party finance companies have offered lottery winner recipients the opportunity to take a lump sum settlement upon winning the lottery. However, the majority of lottery winners decline the lump sum offer since choosing this option results in the incidence of a substantial tax because the recipient must pay tax on the entire lump sum which typically is calculated using the highest income tax bracket. Because of this penalty, the majority of lottery winner recipients forgo the opportunity to take a lump sum payment to avoid loosing a substantial amount of the lottery winnings to taxes; however, a significant number of lottery prize winners still choose the lump sum option because of an immediate financial need.

Deferred compensation has generated another investment opportunity for professional athletes, executives and others entitled to receive such payments. Due to salary caps and other restrictions, professional sports teams often defer a portion of an athlete's compensation to a period of time several years into the future. Many corporations offer executive employees various forms of deferred compensation for a variety of reasons as well. The athlete or executive often earns a nominal rate of interest on the deferred amount, but is otherwise deprived of any ability to diversify the investment to earn a greater rate of return or minimize the risk associated with having a single obligor, such as the professional sports team in the athlete's case or the corporation in the executive's case.

Another recent investment opportunity has developed from life or senior settlement payments. A great number of individual holders of life insurance policies allow their policies to lapse prior to death. A lapsed policy typically generally returns a de minimis cash value, if any. In a life settlement, an individual assigns his life insurance policy to a third party in exchange for current consideration. The third party assumes ownership of the policy, including the right to the death benefit as well as the obligation to make all future premiums. Through use of a life settlement, an individual is able to currently access a portion of his death benefit and invest the proceeds.

Still other examples exist where people own some asset or other property that they desire to sell, but the immediate taxation makes the transfer uneconomic, unless it is possible to postpone taxation on the economic gain from the sale. One example includes the sale of a fine piece of art. If a person sells a painting in year one, then the proceeds of that sale that exceed the seller's purchase price are immediately taxed. Similarly, if a person sells his business assets, then the gain realized from the sale of those assets is immediately taxable at the end of the taxable year in which the business sale occurred. Similar taxation treatment exists for the sale of intangible assets such as patent rights or copyrights, as well as the royalties related thereto. Thus, people have sought to discover methods that permit the sale of an asset as described above but to also spread the tax liability over several years.

As a result, a method is needed that affords the opportunity to invest the present value of future receivable payments or other disposable assets in a manner that permits the owner of such assets to 1) diversify his investment in a manner designed to produce a greater overall rate return; 2) reduce risk of loss associated with having his funds invested with only a single obligor or in a single asset; 3) alter the timing of his existing payment stream which may be inflexible and incongruent with his current economic needs; and 4) accomplish these desires in a tax neutral manner while still observing all applicable tax laws.

SUMMARY OF THE INVENTION

The present invention is a tax advantaged transaction structure (TATS) and method affording owners of disposable property a method for greater flexibility in the manner of investing and the schedule for receiving payments while observing all applicable tax laws in the process. A first entity's asset is evaluated and equated to an initial principal amount, which is based upon the present value of the first entity's asset. An agreement is made for the first entity to assign the disposable asset to a second entity in exchange for a contingent installment obligation. The first entity is enabled to direct an investment portfolio composition that will be established based upon the initial principal amount. The first entity is also given a one-time opportunity to choose the periodic repayment schedule for the satisfaction of the contingent installment obligation. The second entity then sells the disposable property to a third entity for a cash value equivalent to the initial principal amount. The second entity then creates the investment portfolio from the cash proceeds received from the sale to the third entity and then also receives returns upon the portfolio, which are then paid back to the first entity in satisfaction of the contingent installment obligation. At the end of the contingent installment period, the portfolio is liquidated and a lump sum payment is made to the first entity.

A computer software program is implemented to execute many of the steps of the TATS method. The TATS software program includes logic to determine an initial principal amount of a first entity's disposable property that is subsequently assigned to a second entity. The TATS software program configures the initial principal amount based on a discounted present value of the disposable property. The TATS software program incorporates logic to generate a portfolio of financial securities from a database of financial securities for the first entity to select one or more of the financial securities to investment the initial principal amount. The TATS software program additionally instructs an investment manager to establish an investment portfolio with monetary proceeds equivalent to the initial principal amount and thereafter tracks the investment financial performance of the investment portfolio. The TATS software program periodically generates statements for the first entity denoting the performance of the investment portfolio and also directs payment to the first entity at periodic intervals in satisfaction of said contingent installment note.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The tax advantaged transaction structure (TATS) and method of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram of the different types of disposable property that a first entity may implement in TATS as depicted in FIG. 1.

DETAILED DESCRIPTION

Figure 1:
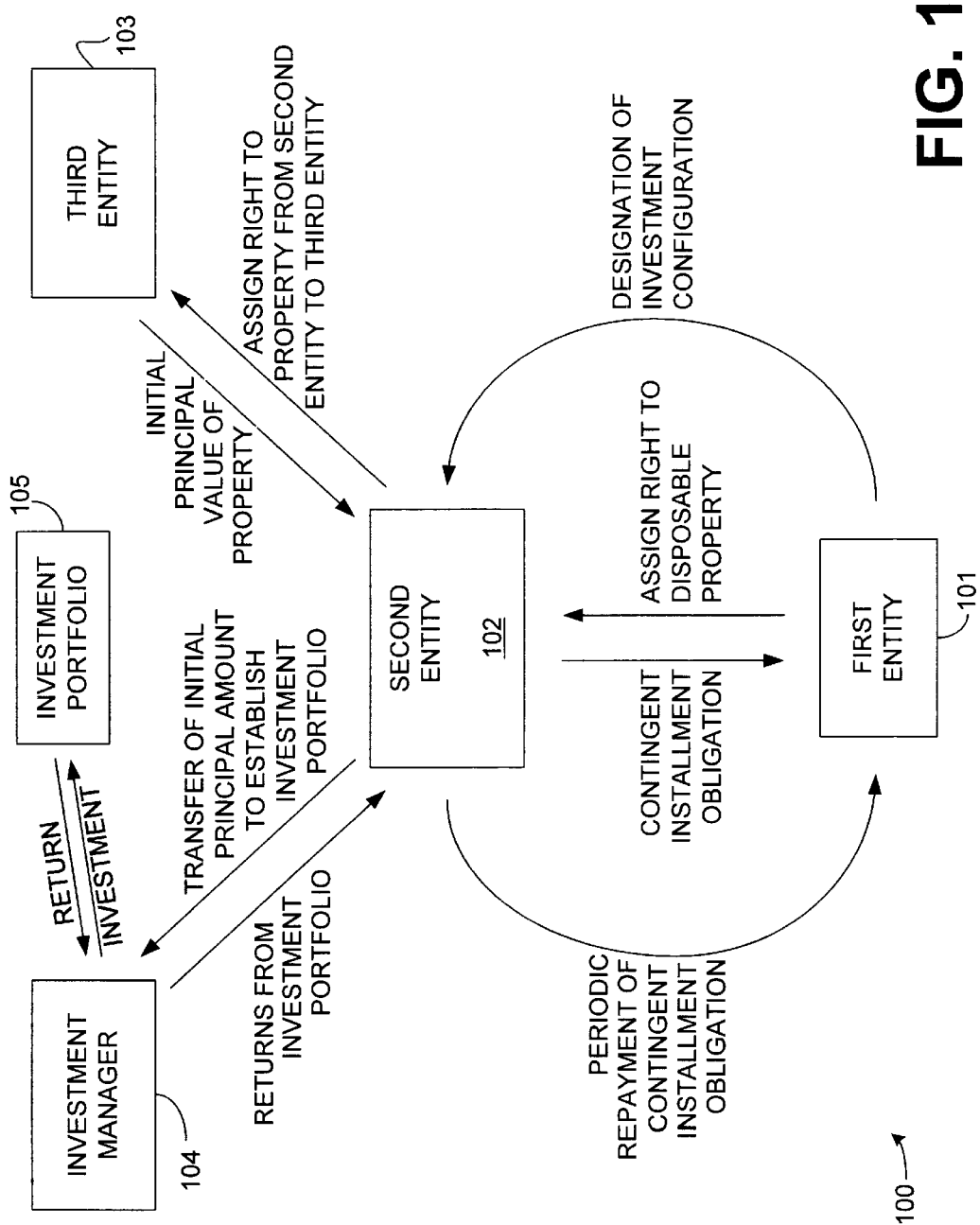
FIG. 1 is a block diagram of the TATS and method, which permits a first entity to assign disposable property for investing in an investment portfolio.

FIG. 1 depicts the overall method 100 employed in the tax advantaged transactions system (TATS) and method of the present invention. In accordance with the method, the first entity 101 is the owner of disposable property that the owner wishes to assign to a second entity 102. For purposes of this application, an entity can be a person, company, partnership, corporation, a combination of the foregoing, or any other interest capable of transacting business. The first entity 101 assigns the disposable property to the second entity 102 in exchange for a contingent installment obligation. The disposable property is further assigned by the second entity 102 to third entity 103 in exchange for cash proceeds. The second entity 102 then causes investment manager 104 to invest the cash proceeds in an investment portfolio 105 containing financial securities selected by the first entity 101. Returns on the investment portfolio 105 are transferred to the second entity 102 and are thereafter paid to the first entity 101 in periodic installments in satisfaction of the contingent installment obligation.

FIG. 2 shows several different types of disposable property 200 that a first entity 101 may implement in the present invention. The list of disposable property types depicted in FIG. 2 is not exhaustive, and one of ordinary skill in the art would recognize additional types of disposable property applicable to the present invention.

As an example, a first entity 101 may wish to sell his future lottery prize payments 201 in exchange for a contingent installment obligation, and direct investment of the cash equivalent proceeds of the future lottery prize payments. In this configuration, a winner of a $1,000,000 lottery may be scheduled to receive $50,000 a year for 20 years. Thus, the first entity 101 may be able to assign lottery proceeds 201 in the amount of $50,000 per year for a set number of years to the second entity 102, and in exchange, the first entity 101 would receive a contingent installment obligation. The investment aspect of the lottery prize payments is discussed more fully below.

As another nonlimiting example, the first entity 101 may also be a structured settlement recipient 202, and desire to obtain the present value for the series of future payments that the first entity 101 will receive as directed by the structured settlement. As discussed above, a structured settlement recipient 202 is a person that is to receive monetary damages because of a previous tort injury suffered by the first entity 101. The damage award to the first entity 101 in this case is paid to the first entity 101 in periodic installments for a set number of years. For example, the structured settlement recipient 202 may have suffered a personal injury caused by a negligent party. In settlement of the claim of the structured settlement recipient 202, an annuity may be established to generate payments to the structured settlement recipient in satisfaction of the settlement. In this example, the annuity may be invested at a nominal rate of interest so that a return on the investment satisfies the amount due to the structured settlement recipient 202 each payment period. The structured settlement recipient 202 is powerless to accelerate or change the payment structure or rate. Structured settlement recipient 202 can only receive the preset amount of payments at the pre-selected time until the payments are exhausted. Thus, structured settlement recipient 202 may implement the present invention by assigning some or all of her future payments in exchange for the contingent installment obligation. The investment aspect of the invention that is generated from the future settlement payments is discussed below.

As yet another example, the first entity 101 may also be a life insurance beneficiary 203. Many policies lapse before the insurance company is required to pay. For that reason, the life insurance beneficiary 203 has a property right as the beneficiary, and may assign that property right just as any other property. The property that is assignable in this situation is the death benefit. Thus, for example, if the first entity 101 owns a life insurance policy that directs payment of $1,000,000 to the beneficiary, the first entity 101 may agree to sell ownership in the policy to the second entity 102 for $350,000. The policy could be a whole life policy with a face value amount or a term life policy and be a candidate for implementation into the present invention. The $350,000 represents the calculated present value of the $1,000,000 reduced from the time considered to by the estimated life span of a human being. The second entity 102 would assume payment of premiums due on the policy as well as any other maintenance required to keep the policy in force. The life of the first entity 101 continues to be the measuring life that triggers payment on the policy. The first entity 101 receives a contingent installment obligation valued at $350,000 and is able to direct the second entity to invest the $350,000 cash proceeds in an investment portfolio 105. Investment in the investment portfolio 105 is discussed in more detail below.

As a further example, the first entity 101 may also be an athlete with a guaranteed compensation provision 204 in his contract with his athletic sports team. The economics of modern sports dictates that many contracts made with athletes include guaranteed provisions for the future payment of money. For example, athlete 204 may contract to be paid $1,000,000 in year one and then a second $1,000,000 to be paid in equal installments over years two through six subsequent to the contract. Thus, in years two through six, athlete 204 will receive $200,000 each year during the five-year period to satisfy the second $1,000,000 contractual payment provision. This amount is a property right that the athlete can dispose of in the present invention. Athlete 204 may assign the property right directing payment of the second $1,000,000 in exchange for a contingent installment obligation. The contingent installment obligation is valued at an initial principal amount equivalent to the discounted present value of the second $1,000,000 that is to be paid in years two through six. As discussed below, athlete 204 may direct investment of the initial principal amount in the investment portfolio 105 and receive periodic repayments in satisfaction of the contingent installment obligation.

As still another example, the first entity 101 may also be the seller of business assets 205. In the sale of a business, seller 205 may receive not only cash, but also stock options and other evidences of ownership as consideration for the sale. Seller 205 may utilize the present invention for the cash that is received from the sale and also other qualifying stock; however, seller 205 may not utilize the present invention for any marketable securities the seller 205 may receive in the sale of the business. The term "marketable securities" means any security for which, as of the date of the disposition between the first entity 101 and the second entity 102, there was a market on an established securities market or otherwise. Nevertheless, the first entity 101 may assign to the second entity 102 rights to cash proceeds, qualifying stock, and other evidence of ownership in return for a contingent installment obligation. The contingent installment obligation would be valued at an initial principal amount equivalent to the present value of the total assets that the first entity 101 chooses to assign to the second entity 102. The first entity 101, just as above, is enabled to direct the second entity 102 to invest the monetary proceeds equivalent to the initial principal amount into an investment portfolio 105.

A deferred compensation provision of an employment contract is another type of disposable property that the first entity 101 may own and implement in the present invention. For example, a deferred compensation recipient 206 may be an employee of a corporation, and a portion of her compensation is some type of guaranteed payment to occur in the future. If the compensation that is to be deferred to a later time is guaranteed to the employee recipient 206, the employee may treat the guaranteed deferment as disposable property for implementation in the present invention. Thus, deferred compensation recipient 206 may assign the right to receive all or part of the deferred compensation to the second entity 102 in exchange for a contingent installment obligation. Just as in the case of the business asset sale, if the deferred compensation due employee recipient 206 includes marketable securities, that portion of the compensation is ineligible for inclusion in the present invention.

In the deferred compensation arrangement, a contingent installment obligation may be valued at an amount equivalent to the discounted present value of the deferred compensation payments assigned to the second entity 102. Recipient employee 206 may direct the second entity 102 to invest the monetary proceeds equivalent to the initial principal valuation of the future compensation payment in financial securities selected by recipient employee 206 in establishment of an investment portfolio 105. The investment of these proceeds is discussed more fully below.

The first entity 101 may also be the owner of an asset where the sale of which incorporates an economic gain 207. For example, the owner of a painting has a disposable property right in that painting and may implement it in the present invention for the present value of that painting. The economic gain in the painting is the difference between the purchase price paid by the owner 207 and the sale price paid by a subsequent purchaser. That differential amount is a property right that the owner of the painting may implement in the present invention. In this example, the first entity 101, who owns the painting, may assign its rights in the painting to the second entity 102 in exchange for a contingent installment obligation that is valued to the present value of the painting. The first entity 101 may elect to configure the contingent installment obligation to include all or part of the proceeds from the sale of the painting. Once the value of the contingent installment note is determined, the first entity 101 may direct the second entity 102 to invest the proceeds from the painting sale into financial securities selected by the first entity 101 and thereby create an investment portfolio 105. It should be obvious to one of ordinary skill in the art that both tangible assets, like the painting example above, and intangible assets such as patent rights and copyrights, as well as the royalties related thereto, may be implemented in the present invention. This invention includes those types of disposable property and all other types that would be obvious to include to one of ordinary skill in the art.

Figure 3A:
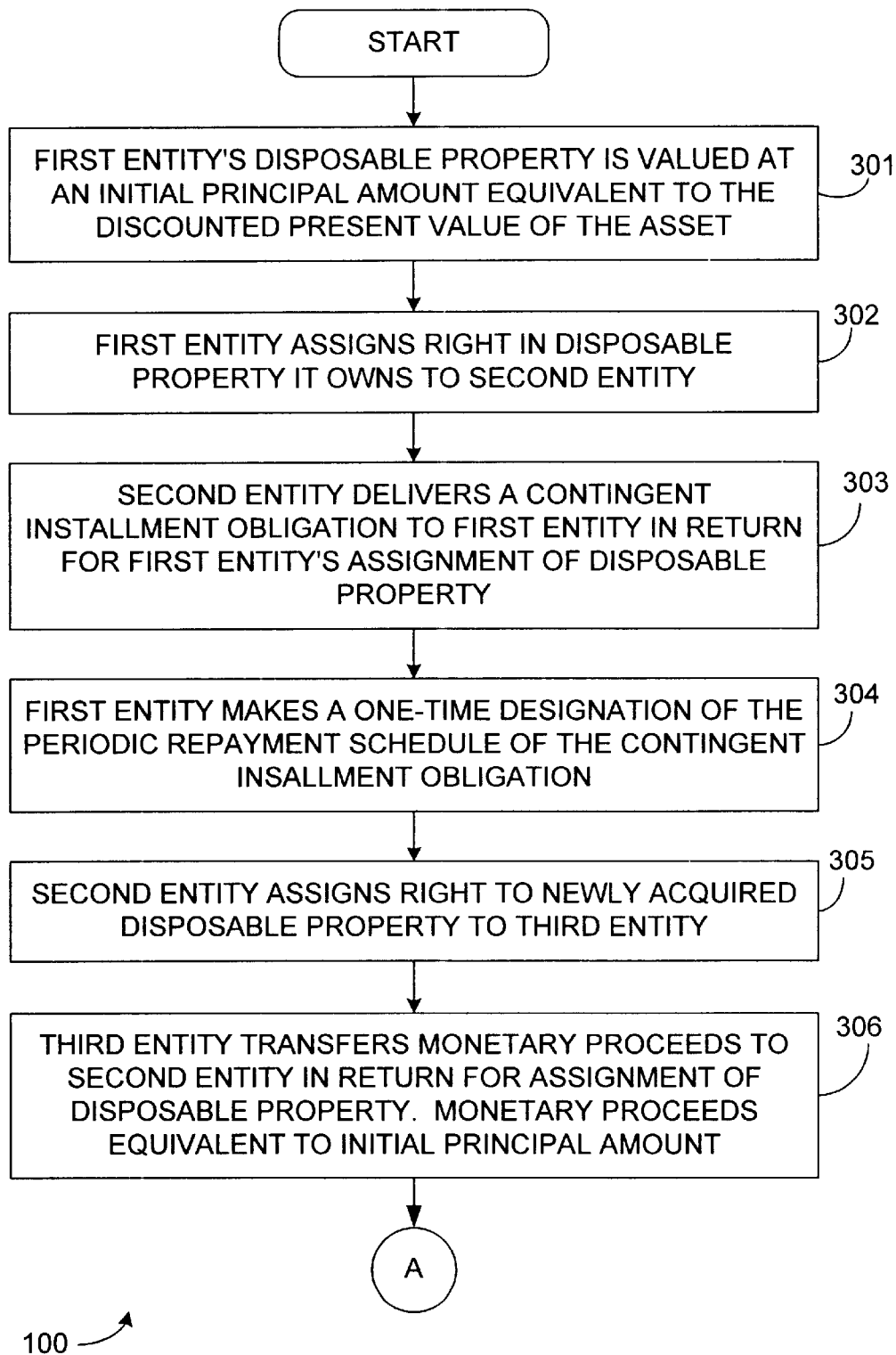
FIGS. 3A and 3B are flow charts of the steps employed in the preferred embodiment of the TATS as depicted of FIG. 1.

Referring to FIG. 3A, one of the first steps in accordance with the TATS method requires that the disposable property belonging to the first entity 101 be valued 301 at an initial principal amount. The initial principal amount will be the amount upon which the contingent installment obligation is based. Typically, valuation of the disposable asset belonging to the first entity 101 requires calculation of the present value of the asset. In the case when the disposable property includes a future stream of payments, the initial principal amount would represent the discounted present value of the sum of payments to be assigned to the second entity 102. For example, assume that the first entity 101 desired to assign $1,000,000 in lottery payments that are payable to the first entity 101 at the rate of $50,000 a year for 20 years. Assume further that the second entity 102 determines that the discounted present value of the sum of the $50,000 payments over the 20-year period totals $400,000. Thus, the initial principal amount for which the contingent installment obligation is based would be $400,000 rather than $1,000,000. Once the first entity 101 and the second entity 102 agree on $400,000 as the initial principal amount as the value of the disposable property, the first entity 101 executes an assignment of the disposable property 302 to the second entity 102 and the second entity 102 issues contingent installment obligation 303 to the first entity 101.

The first entity 101 is afforded a one-time opportunity to select a periodic payment schedule 304 to satisfy the contingent installment obligation. For example, if the first entity 101 is a lottery prize winner 201 that previously received prize payments annually prior to assigning payments to the second entity 102, the first entity 101 may instead prefer to receive payments from the contingent installment obligation every quarter. Once the first entity 101 selects the repayment schedule 304 of the contingent installment obligation, first entity 101 cannot change the schedule again.

In order to begin repayment in satisfaction of the contingent installment obligation, the second entity 102 must sell its acquired right in the disposable property 305 to a third entity 103 for monetary proceeds. In this transaction, third entity 103 receives the right to the assigned right to the disposable property and in return transfers to the second entity 102 monetary proceeds equivalent to the initial principal value of the property 306. Thus, continuing the previous example, third entity 103 would become the owner of the right to receive the lottery payments of $50,000 a year for twenty years and would in turn pay to the second entity 102 an amount of $400,000 cash. The second entity 102 would have no further interest in collecting the lottery payments originally payable to the first entity 101.

Figure 3B:
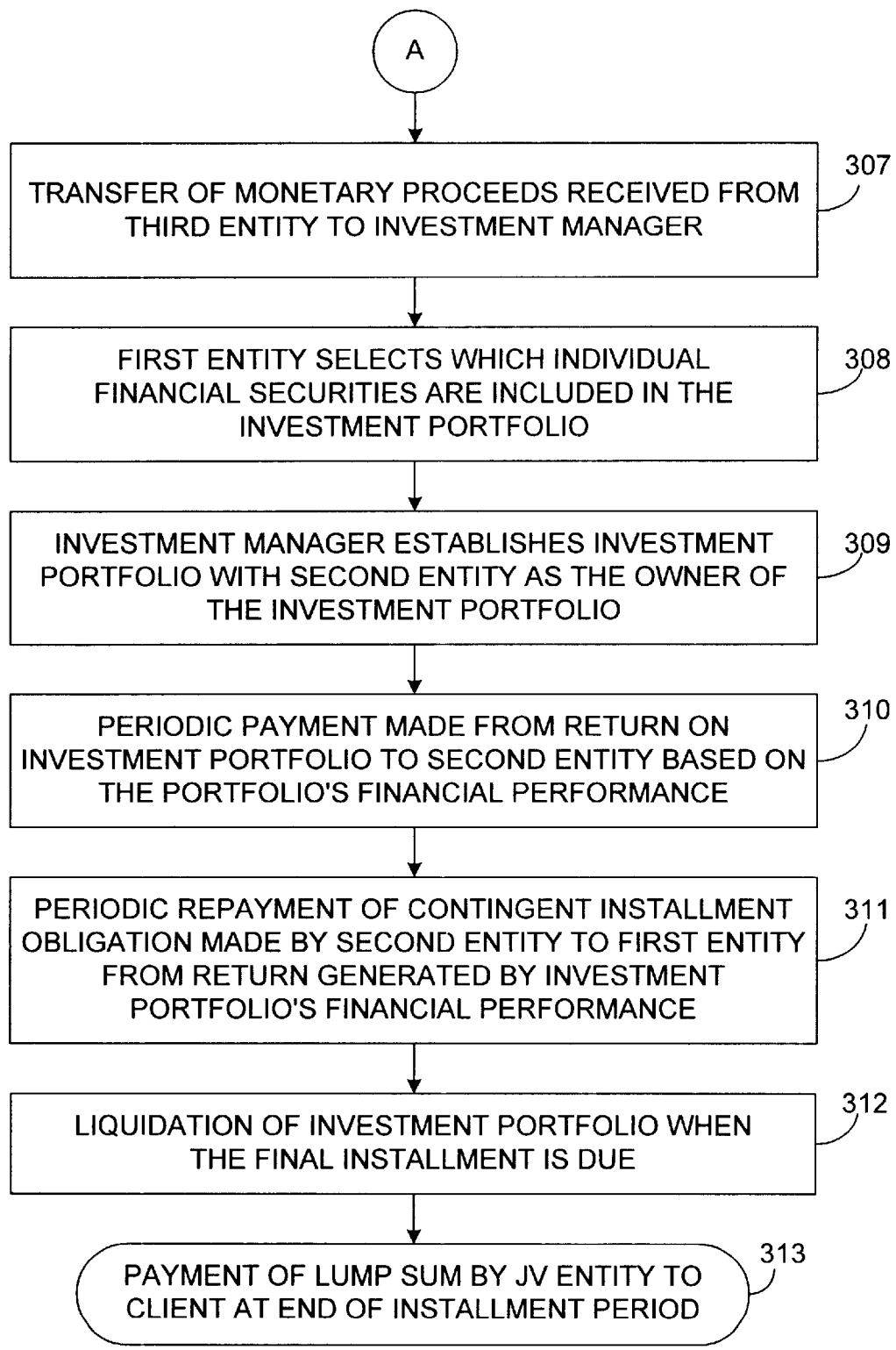

Turning to FIG. 3B, once the second entity 102 has obtained the monetary proceeds equivalent to the initial principal value of the disposable property 306, the second entity 102 invests the proceeds 307 in order to generate a monetary return to make repayment on the contingent installment obligation. In one embodiment, the second entity 102 oversees all investing functions required to establish and maintain the investment portfolio 105. In another embodiment, the second entity 102 contracts with investment manager 104 to establish and maintain the investment portfolio 105. In this transaction, the second entity 102 transfers the monetary proceeds equivalent to the initial principal amount 306 to investment manager 104 for establishment of the investment portfolio 105. Investment manager 104 invests the proceeds in financial securities selected by the first entity 101 to create the investment portfolio 105 but establishes the second entity 102 as the owner 309 of the investment portfolio 105. Investment manager 104 is charged with not only maintaining the investment portfolio 105, but also making regular payments 310 to the second entity 102 based upon returns generated by the financial performance of the investment portfolio 105. The financial performance of the investment portfolio is determined based on the rise or fall in market price of each individual financial security contained in the investment portfolio 105.

The first entity 101 is afforded the opportunity to select which financial security investments 308 are included in the investment portfolio 105. Furthermore, the first entity 101 may change the composition of the investment portfolio 105 at any time by designating the addition or deletion of individual financial securities. Changes in the investment portfolio 105 are initiated by the first entity 101 and conveyed to the second entity 102. As the second entity 102 owns the funds invested with investment manager 104, the second entity 102 directs investment manager to adjust the investment portfolio 105 to comport to the desired portfolio composition as selected by the first entity 101.

Figure 4:
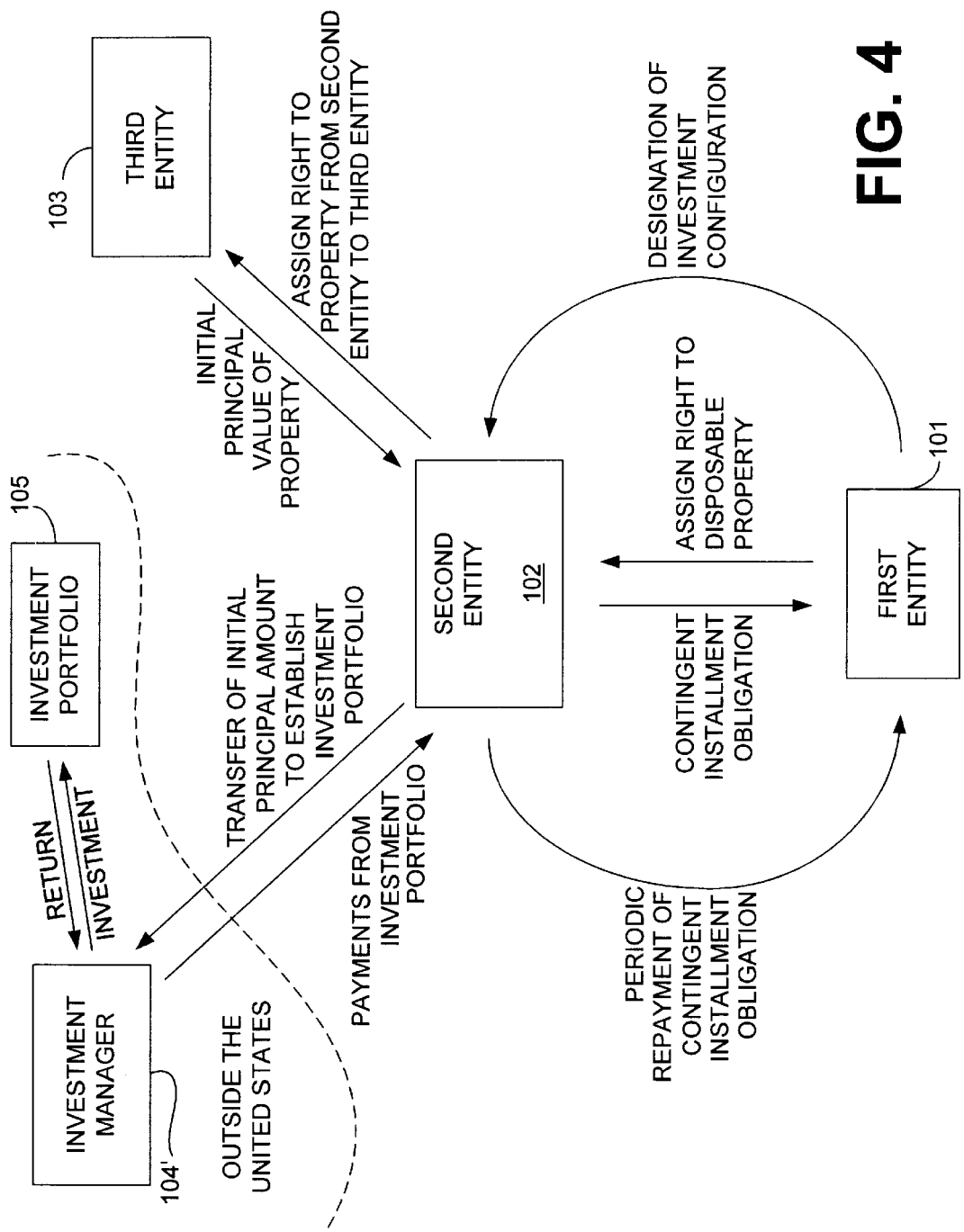
FIG. 4 is a block diagram of an alternative embodiment of the present invention of FIG. 1 wherein investment manager is a non-United States entity or not otherwise subject to United States income taxation.

A third embodiment of the present invention for establishing the investment portfolio 105 is depicted in FIG. 4. This embodiment requires that alternative investment manager 104' is a non-United States entity or is not otherwise subject to United States income taxation. For example, alternative investment manager 104' may be a bank or other financial institution located outside of the United States. Just as above, the second entity 102 transfers monetary proceeds equivalent to the initial principal amount 306 to the alternative investment manager 104'. Alternative investment manager 104' creates an investment portfolio 105 containing financial securities as selected by the first entity 101 that are purchased from the monetary proceeds 307. Alternative investment manager 104' makes periodic payments 310 to the second entity 102 from the returns generated by the investment portfolio 105.

Regardless as to whether it is the second entity 102 or investment manager 104 that creates and maintains the investment portfolio 105, the first entity 101 is neither the owner nor the beneficiary of the investment portfolio 105. The right of the first entity 101 in the investment portfolio 105 is limited to that of a general unsecured creditor, so the first entity 101 has no present or future security interest in the investment portfolio 105. Additionally, the first entity 101 has no right to demand payment or to collect proceeds based upon the performance of the investment portfolio 105.

Returns generated from the investment portfolio 105 are used to make payments 311 to the first entity 101 in satisfaction of the contingent installment obligation. If returns generated from the financial performance of the investment portfolio 105 exceed the required payment for any individual period, the second entity 102 only makes payment to the first entity in the amount of the required payment as directed by the contingent installment obligation. The excess portion is reinvested in the investment portfolio 105 as new principal. If the financial performance of the investment portfolio 105 creates a return that is less than the expected periodic payment as directed by the contingent installment obligation, then the first entity 101 only receives the lesser amount as payment and the principal of the investment portfolio 105 may or may not invaded to satisfy the difference. While it is the goal of the present invention to meet and exceed the amount of payments the first entity 101 was originally receiving under his lottery payment scheme, structured settlement and etc., that situation may not always be the case. The first entity 101 is informed of the volatility of investments to enable the first entity 101 to make as informed a decision in selecting financial securities as possible. However, depending on the rate of return on the investment portfolio 105, the amount of the investment portfolio may grow such that the first entity 101 may continue to receive payments equal to or greater than the original payment scheme over the length of time of the contingent installment obligation.

Once the term of the contingent installment obligation has reached its end, the second entity 102 liquidates 312 the investment portfolio 105 and pays a lump sum amount to the first entity 101 as a final payment 313 in satisfaction of a contingent installment obligation. If the second entity 102 has incorporated an investment manager 104 to create and maintain the investment portfolio 105, then the second entity 102 merely instructs investment manager 104 to terminate the investment portfolio 105. The second entity 102 receives the investment portfolio's proceeds and directs that final payment in satisfaction of the contingent installment obligation be made to the first entity 101.

Figure 5:
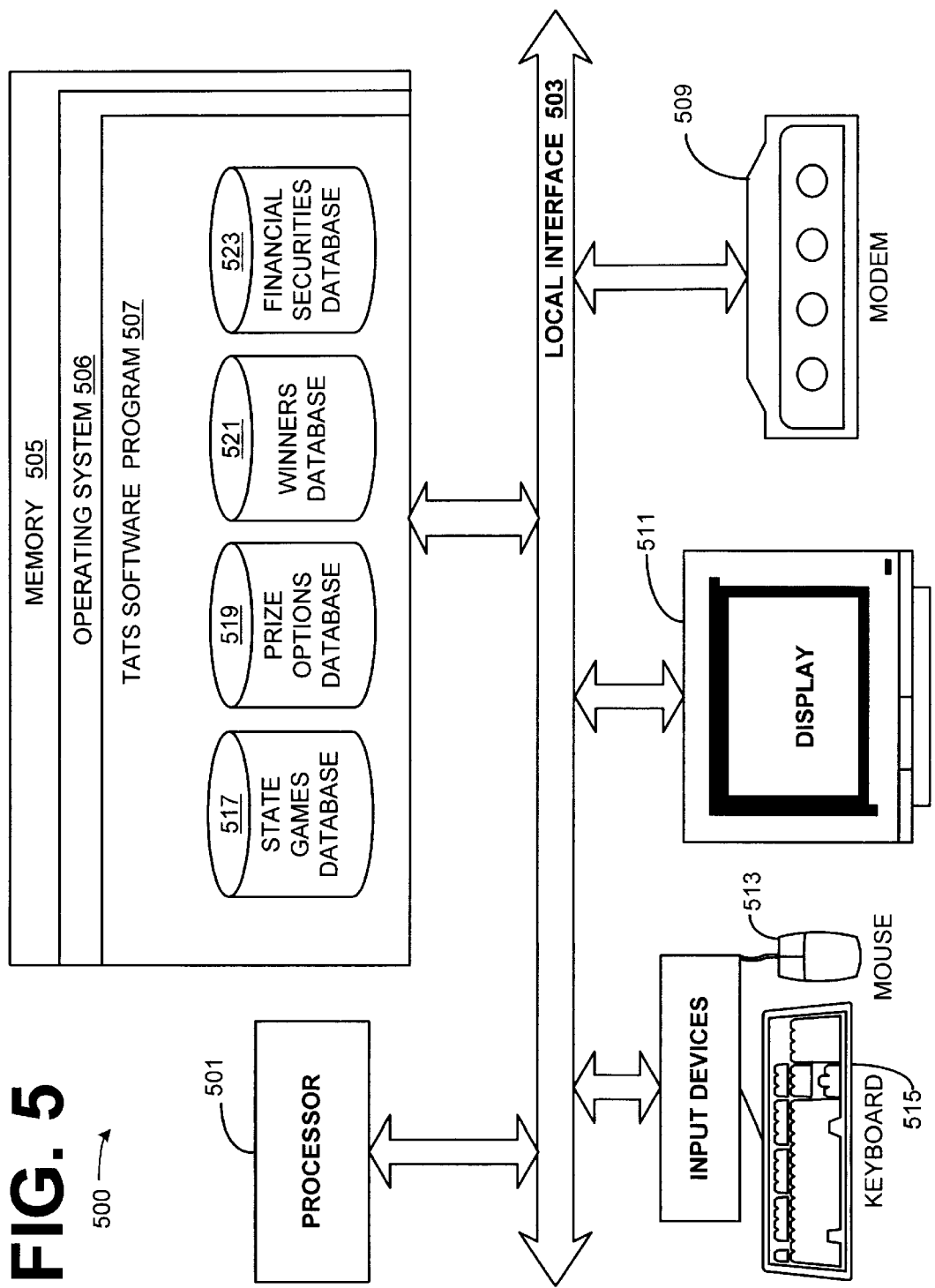
FIG. 5 is a block diagram of a computer system to execute steps of the TATS computer software program configured to facilitate the method depicted in FIG. 1.

The second entity 102 implements a computer system 500 to automate many of the steps described above. FIG. 5 shows a computer system 500 and the TATS software program 507 that operates from memory 505 of the computer system 500. The computer 500 includes a keyboard 515 and mouse 513 as input devices and display 511 which all communicate by local interface 503. Processor 501 executes the instructions of the TATS software program 507, and modem 509 exchanges data with devices external to the computer 500. The TATS software program software program 507 is configured to implement any of the disposable property types described above and shown in FIG. 2, and may be easily modified to include disposable property types not explicitly described but obvious to one of ordinary skill in the art.

It should be obvious to one of ordinary skill in the art that the TATS software program 507 could be implemented in a distributed computer system. As a nonlimiting example, portions of the TATS software program 507 could execute on different computer systems and share data via the Internet or other communication methods. A computer system at a first location executing the TATS software program could contain various databases of information that are accessible over the Internet by a computer system at a second location also executing the TATS software program 507.

FIGS. 6A through 6D show the steps of execution followed by the TATS software program 507. The TATS software program 507, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 6A:
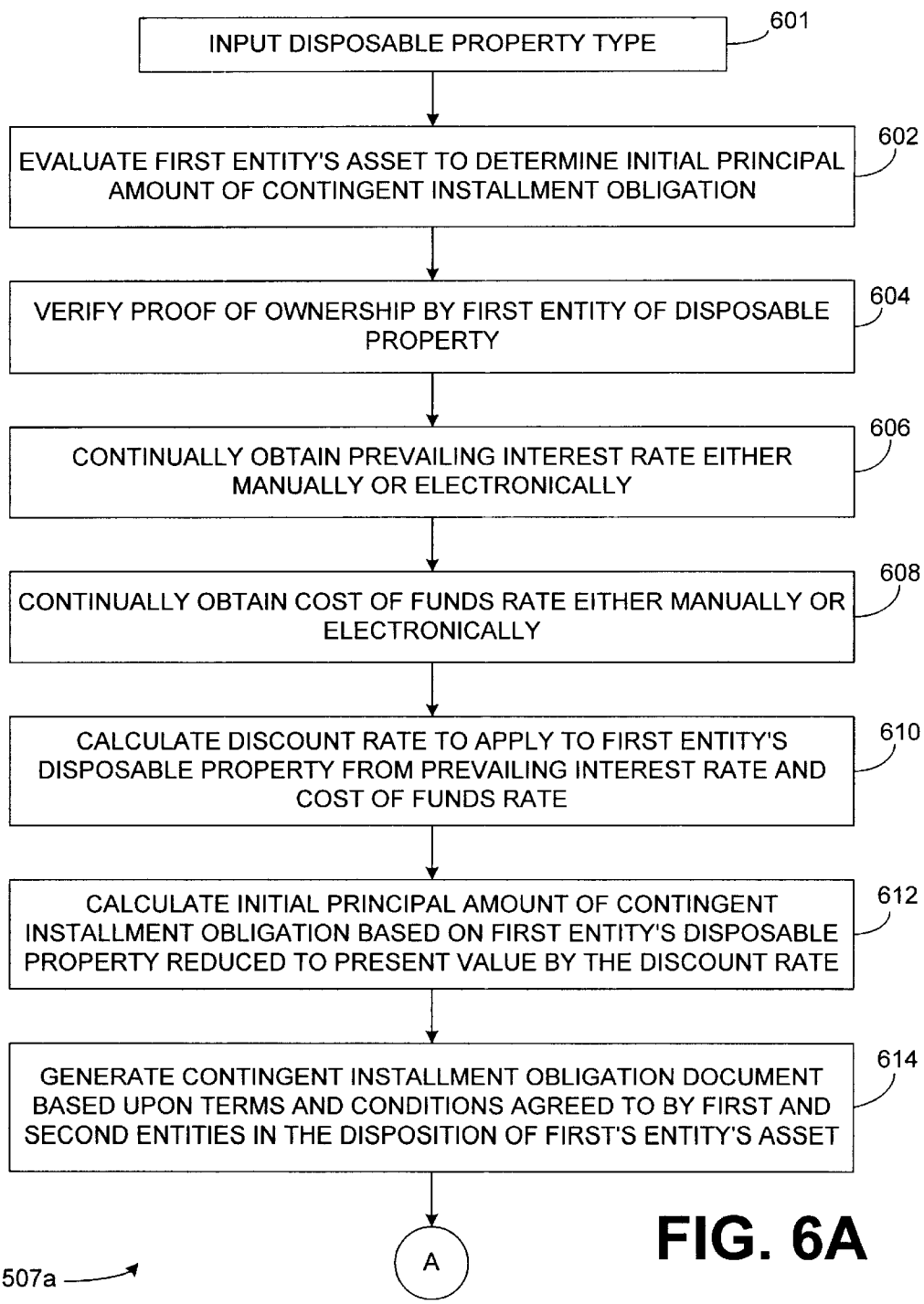
FIGS. 6A through 6D are flow charts of the steps performed by the TATS computer software program of FIG. 5.

As the first entity 101 and the second entity 102 negotiate terms of the assignment of the disposable property in exchange for the contingent installment obligation, the TATS software program 507 is involved in many of the steps to enable the property disposition to occur. FIG. 6A depicts that once the first entity 101 is identified in the TATS software program 507, the type of disposable asset is input 601 to enable the TATS software program 507 to evaluate the property to determine the initial amount 602 of the contingent installment obligation.

If the disposable asset owned by the first entity 101 is future lottery payments 201, for example, the TATS software program 507 includes a series of checks to verify accuracy of the alleged prize. As shown in FIG. 5, the TATS software program 507 maintains a state game database 517 of all the states in the United States that currently operate some form of lottery game. The state game database 517 is accessed to verify that the first entity 101 won a legitimate lottery game currently in operation. The TATS software program 507 also maintains a prize options database 519 that includes the rules and terms and conditions associated to each game offered by each state contained in state game database 517. The prize options database 519 includes, for example, whether a particular state permits a lottery winner to assign lottery prize payments or whether a particular state prohibits assignment of certain payments or a certain number of payments. Any such details pertinent to a lottery game are included in the prize options database 519, and this database 519 is accessed to verify that compliance with all applicable rules is observed.

The TATS software program 507 also maintains a winner's database 521 that includes current personal information about any lottery prize winner that may implement the method and system of the present invention. The winner's database 521 includes information such as a lottery winner's name, address, amount of lottery prize win, date of that win, and the state in which the game was won. Information about a lottery winner's name and address may be updated in the winner's database 521 if either changes. The personal information for the first entity 101 is entered by the TATS software program 507 into the winner's database 521 for future reference.

Returning to FIG. 6A, evaluation of the first entity's asset 602 not only requires verification of information contained on the state game database 517, prize options database 519, or the winner database 521, but also verification that the first entity 101 is duly entitled to the lottery prize, structured settlement or other disposable property without additional encumbrances. Thus, the first entity 101 must furnish official documentation evidencing authentic ownership 604 in the disposable asset to be assigned to the second entity 102. The TATS software program 507 includes logic requiring affirmative input denoting that the first entity 101 owns the disposable asset to be assigned.

After the first entity is determined to be the lawful owner of the disposable asset 604, an initial principal amount must be determined 612 that equals the discounted present value of the asset. The discount rate 610 applied by the TATS software program 507 is calculated based on a prevailing market interest rate 606 and a cost of funds rate 608. The prevailing interest rate 606 may be obtained by manual user input to the TATS software program 507 or electronically over the Internet. The cost of funds rate 608 is an interest rate set by the second entity 102 to include factors such as the second entity's cost of doing business and a nominal profit margin. The TATS software program 507 reconfigures the discount rate 610 based on the factors described above to calculate the present value 612 of the disposable asset to be assigned.

The TATS software program 507 includes functionality to generate the contingent installment obligation 614 that directs assignment of the disposable asset to the second entity 102. The TATS software program 507 also accepts input denoting that the assignment of the disposable property has been executed.

Figure 6B:
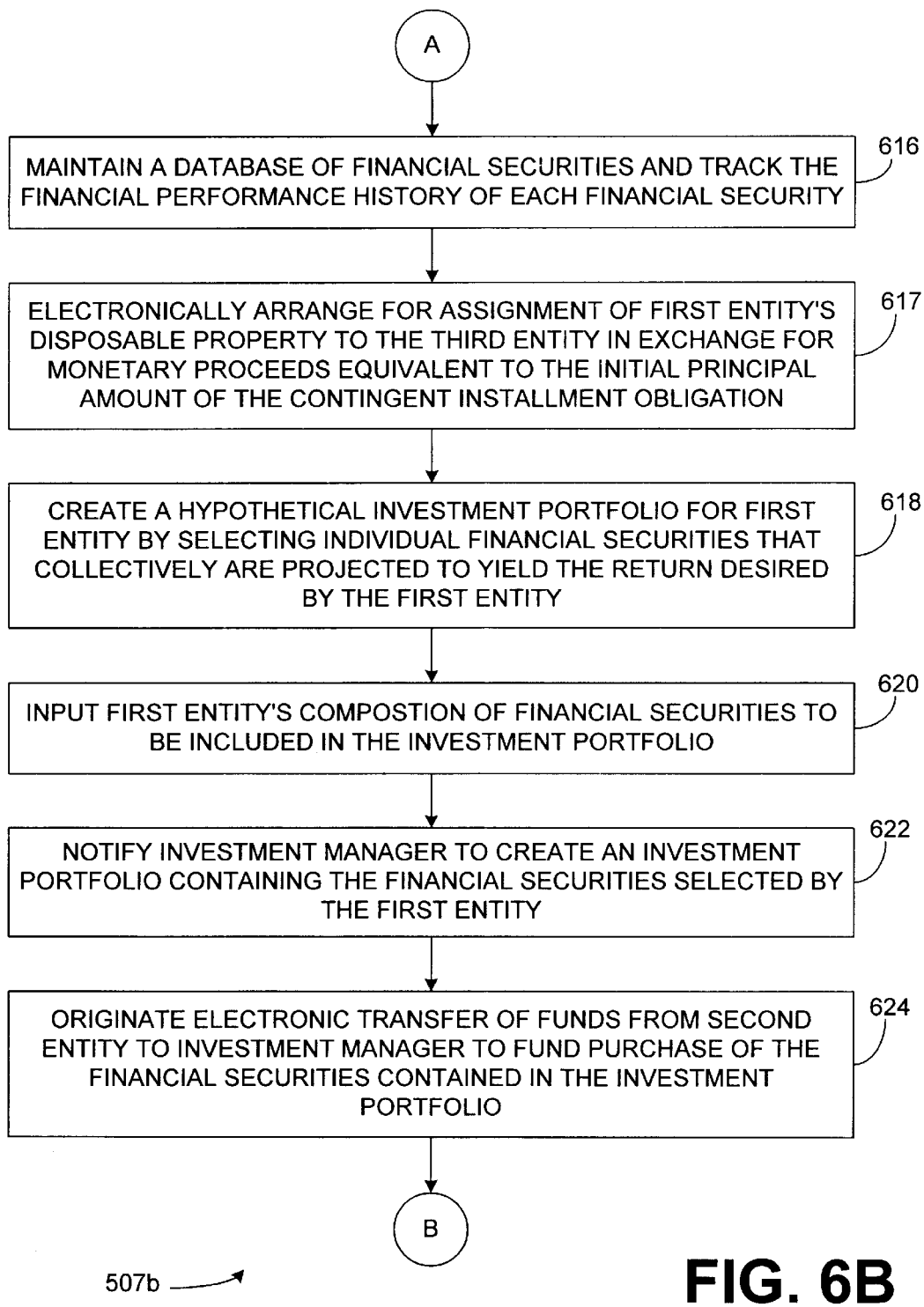

The TATS software program 507 includes logic to maintain a database of financial securities 523 as depicted in FIG. 5. The first entity 101 is enabled to select a composition of financial securities 620 for inclusion in the investment portfolio 105. As shown in FIG. 6B, the TATS software program 507 maintains historical performance information 616 on each financial security included in the database financial securities 523. From the database financial securities 523, the TATS software program 507 generates a hypothetical investment portfolio 618 that contains computer selected financial securities. The hypothetical investment portfolio 618 is based on the initial principal amount after the TATS software program 507 denotes assignment of the disposable property to the third entity 103 for monetary proceeds 617. The TATS software program 507 creates the hypothetical investment portfolio 618 by selecting individual financial securities that the TATS software program 507 forecasts to collectively yield a desired return as stipulated by the first entity 101. The TATS software program 507 accepts the desired yield as input and configures the hypothetical investment portfolio 618 by selecting an assortment of financial securities in the database of financial securities 616 based on the past performance of each security stored on the database 616. Based on the hypothetical investment portfolio 618, the TATS software program 507 calculates a projected future cash flow payable to the first entity 101 over the life of the contingent installment obligation if the first entity 101 selects the exact configuration in the hypothetical investment portfolio 618.

When the first entity 101 selects the desired financial securities 620 to include in the investment portfolio 105 whether from the hypothetical investment portfolio 105 or otherwise, the TATS software program 507 prepares to instruct the investment manager 104 to create the investment portfolio 105. At this point, the second entity 102 has assigned its newly acquired right in the disposable property to the third entity 103 in return for cash equivalent to the initial principal amount. The TATS software program 507 denotes the assignment to the third party 103 and the amount actually received in return.

Figure 6C:
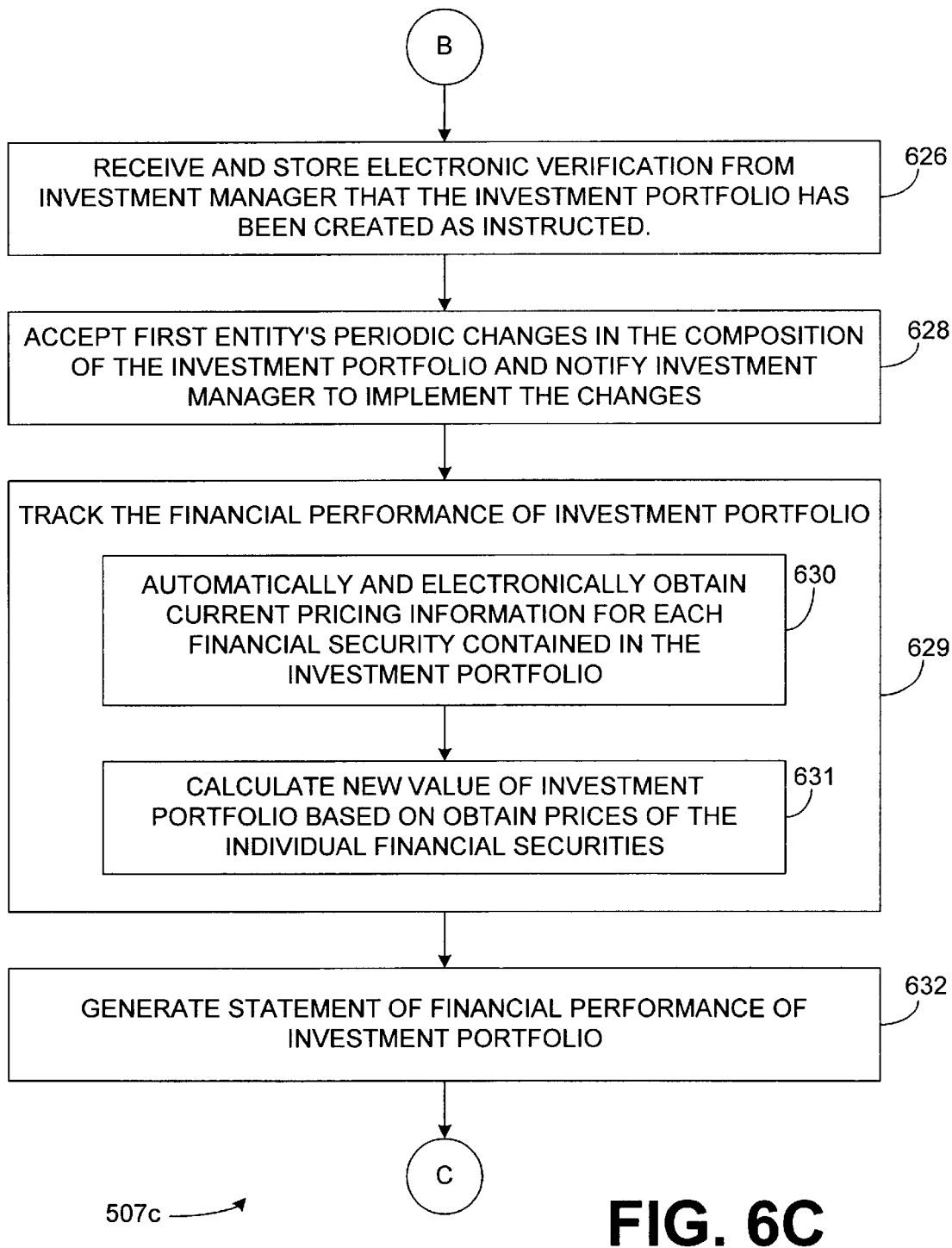

The TATS software program 507 includes logic to electronically notify 622 investment manager 104 to establish the investment portfolio 105 and also arranges transfer of the initial principal amount 624 to effectuate creation of the investment portfolio 105. The electronic notification includes instruction as to the desired financial securities to purchase 620 as directed by the first entity 101. Turning to FIG. 6C, the TATS software program 507 stores verification information 626 received by the investment manager 104 denoting establishment of the investment portfolio 105. The TATS software program 507 also electronically notifies the investment manager 104 of any changes in portfolio composition 628 designated by the first entity 101 in similar fashion as above.

The TATS software program 507 includes logic to track the financial performance 629 of the investment portfolio 105 electronically. Through the Internet, the computer program electronically receives the current price for each security 630 maintained on the database of financial securities 523. The TATS software program 507 calculates an updated value of the investment portfolio 105 based upon the most current pricing information electronically obtained 631. The TATS software program 507 includes logic to periodically generate a statement of performance 632 of the financial securities in the investment portfolio 105 for communication to the first entity 101. The TATS software program 507 may generate performance statements on paper or may electronically notify the first entity 101 via methods such as electronic mail or secure Internet web sites.

Figure 6D:
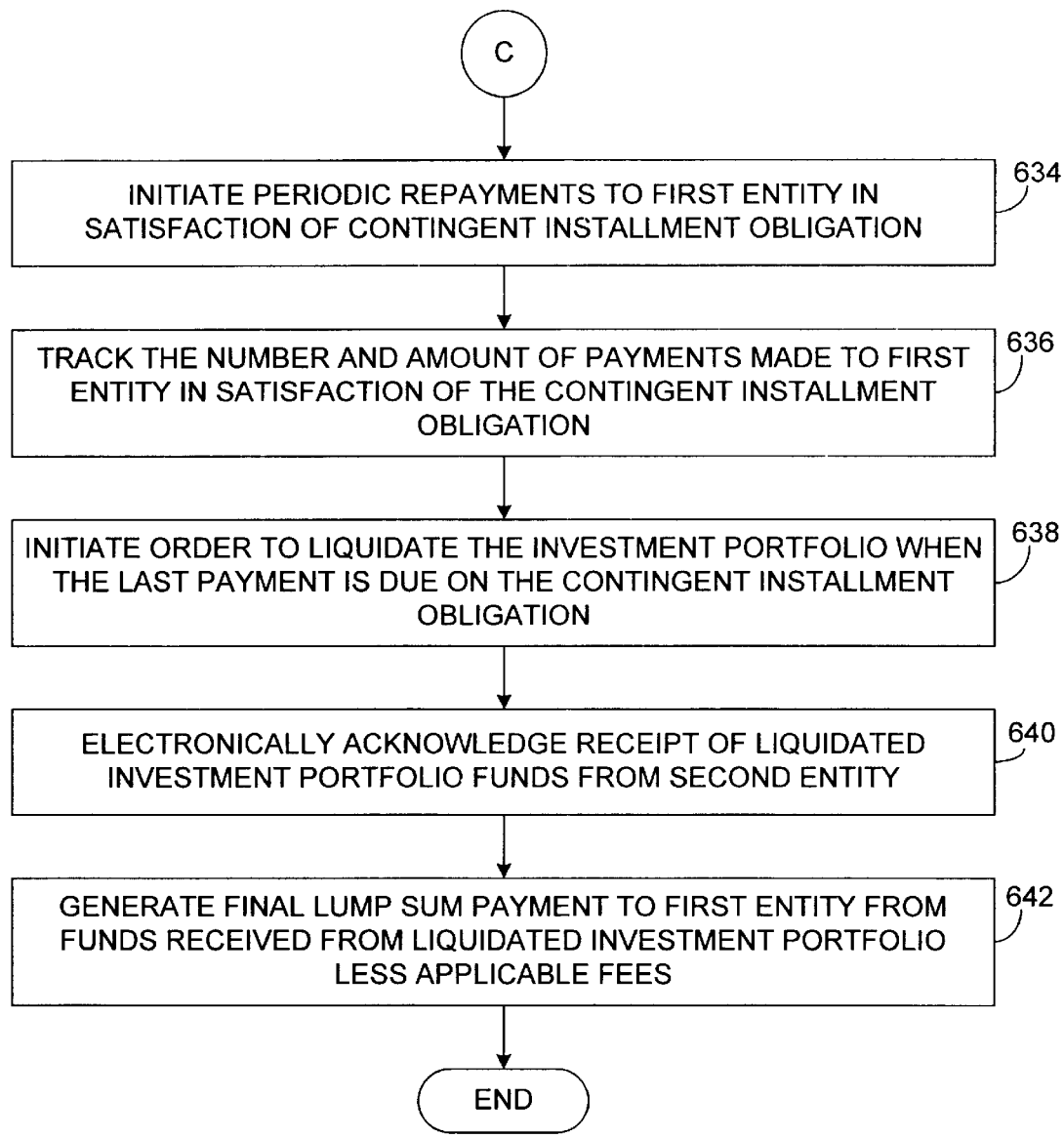
Figure 7:
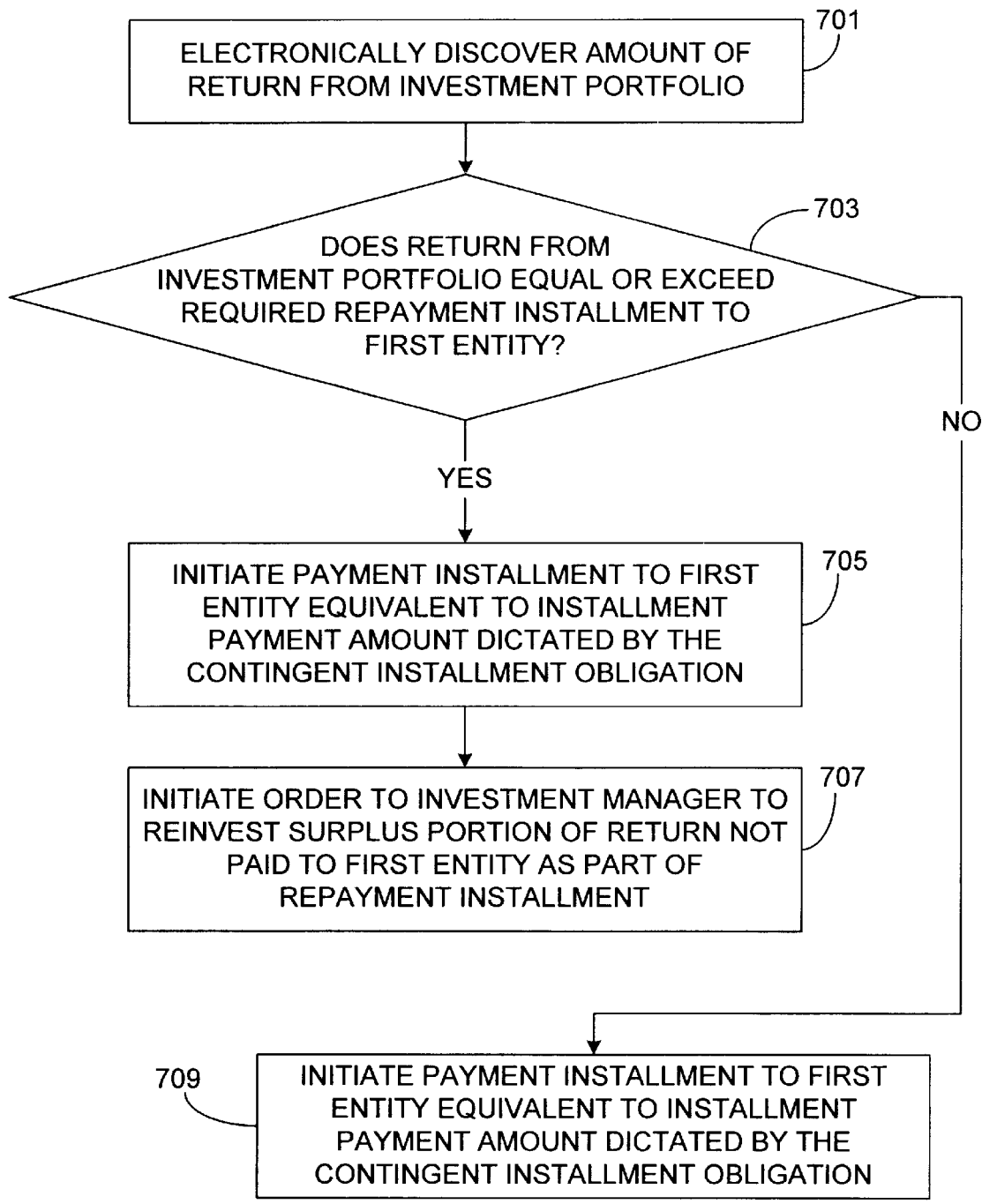
FIG. 7 is a flow chart of the steps performed by the TATS computer software program to execute repayment on the contingent installment obligation as depicted in FIG. 6C.

In FIG. 6D, the TATS software program 507 includes logic to generate periodic payments 634 to the first entity 101 based upon returns generated from the financial performance of the investment portfolio 105. FIG. 7 shows the events performed by the TATS software program 507 to execute repayment on the contingent installment obligation 634 to the first entity 101. The TATS software program 507 evaluates the amount of the return 701 and determines the proper payment 703 to be made to the first entity 101. Logic is included in the TATS software program 507 to limit the period payment to the amount directed by the contingent installment obligation if the return exceeds the obligation directed amount 705. The TATS software program 507 also directs reinvestment with the surplus of the return 707 in the investment portfolio 105.

If the TATS software program 507 determines that the return is less than the contingent installment obligation maximum periodic payment amount, logic is executed directing the entire return to be paid to the first entity 101 as a repayment installment of the contingent installment obligation 709. The TATS software program 507 may or may not permit invasion of the principal amount invested in the investment portfolio 105 depending on the configuration of the contingent installment obligation.

Returning to FIG. 6D, the TATS software program 507 tracks periodic repayment of the contingent installment obligation 636 and initiates an order to terminate the investment portfolio 105 when the term of the contingent installment obligation is complete 638. At the end of the contingent installment obligation term, the TATS software program 507 directs investment manager 104 to liquidate the investment portfolio 105 and return the remaining proceeds 640 to the second entity 102. Receipt of the proceeds may either be manually recognized and entered into the TATS software program 507 or electronically recognized by electronic funds transfer processes. At that time, the TATS software program 507 generates a final payment 642 to the first entity 101 that is equivalent to the final balance of the investment portfolio less any applicable fees.

The flow charts of FIGS. 6A through 6D and also FIG. 7 show the architecture, functionality, and operation of a possible implementation of the TATS software program 507. In this regard, each block represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession in FIG. 6A may in fact be executed substantially concurrently or the blocks may sometimes be executed in the reverse order, depending upon the functionality involved, as will be further clarified hereinbelow. Additionally, it should be noted that one or more of the functions noted in the blocks could be manually performed while others performed in an automated manner via, for example, a computer.

The TATS software program 507 and the method of the present invention can be implemented in hardware, software, firmware, or a combination thereof. In the preferred embodiment(s), the TATS software program 507 is implemented in software or firmware that is stored in a memory and that is executed by a suitable instruction execution system (See FIG. 5). If implemented in hardware, as in an alternative embodiment, the TATS program 507 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for investing, comprising the steps of:
   causing the formation of an agreement for the disposition of a first entity's property that is valued at an initial principal amount to a second entity in exchange for a contingent installment obligation issued by said second entity to said first entity; and
   causing the establishment of an investment portfolio with monetary proceeds equivalent to said initial principal amount of said property wherein said second entity makes periodic repayments to said first entity in satisfaction of said contingent installment obligation based on said investment portfolio's financial performance.

2. The method of claim 1, further comprising the step of:
   causing said second entity to assign said property to a third entity in exchange for said monetary proceeds.

3. The method of claim 1, further comprising the steps of:
   causing said investment portfolio to be implemented so that said first entity is not the owner or beneficiary of said investment portfolio; and
   causing said investment portfolio to be implemented so that said first entity's rights in said investment portfolio are limited to general unsecured creditor rights wherein said first entity has no present or future security interest in said investment portfolio.

4. The method of claim 3, further comprising the step of:
   structuring said periodic repayment of said contingent installment obligation so that at least one payment is made to said first entity after the close of the taxable year in which said disposition of said first entity's property occurred.

5. The method of claim 4, further comprising the steps of:
   causing said first entity to select a desired investment configuration for said investment portfolio;
   causing said first entity to select a schedule for said periodic repayment of said contingent installment obligation wherein said schedule selection cannot be changed by said first entity thereafter.

6. The method of claim 5, further comprising the step of:
   removing from said first entity any control over when said periodic repayment will be received by said first entity after said schedule selection.

7. The method of claim 6, further comprising the step of:
   removing from said first entity any power to demand or collect proceeds of said contingent installment obligation from said second entity.

8. The method of claim 7 wherein said disposable property comprises payments from a lottery.

9. The method of claim 7 wherein said disposable property comprises payments from a structured settlement.

10. The method of claim 7 wherein said disposable property comprises payments from a business asset sale, said assets including qualifying stock and other evidence of business ownership but excluding marketable securities.

11. The method of claim 7 wherein said disposable property comprises future life insurance benefits.

12. The method of claim 7 wherein said disposable property comprises payments resulting from guaranteed provisions of a professional athlete's compensation contract.

13. The method of claim 7 wherein said disposable property comprises payments resulting from a deferred compensation provision of an employee compensation contract.

14. The method of claim 7 wherein said disposable property comprises payments resulting from a guaranteed payment provision in a contract.

15. The method of claim 7 wherein said disposable property comprises the sale of a tangible asset wherein an economic gain results.

16. The method of claim 7 wherein said disposable property comprises the sale of an intangible asset wherein an economic gain results.

17. A method for investing, comprising the steps of:
  causing the formation of an agreement for the disposition of a first entity's property that is valued at an initial principal amount to a second entity in exchange for a contingent installment obligation issued by said second entity to said first entity; and
  causing a transfer of monetary proceeds equivalent to said initial principal amount of said property from said second entity to a fourth entity wherein said fourth entity establishes an investment portfolio and makes periodic payments to said second entity based on said investment portfolio's financial performance, and wherein said second entity makes periodic repayment to said first entity in satisfaction of said contingent installment obligation from payments received from said fourth entity.

18. The method of claim 17, further comprising the steps of:
  causing said second entity to assign said property to a third entity in exchange for said monetary proceeds.

19. The method of claim 17, further comprising the steps of:
  causing said investment portfolio to be implemented so that said first entity is not the owner or beneficiary of said investment portfolio; and
  causing said investment portfolio to be implemented so that said first entity's rights in said investment portfolio are limited to general unsecured creditor rights wherein said first entity has no present or future security interest in said investment portfolio.

20. The method of claim 19, further comprising the step of:
  structuring said periodic repayment of said contingent installment obligation so that at least one payment is made to said first entity after the close of the taxable year in which said disposition of said first entity's property occurred.

21. The method of claim 20, further comprising the steps of:
  causing said first entity to select a desired investment configuration for said investment portfolio;
  causing said first entity to select a schedule for said periodic repayment of said contingent installment obligation wherein said schedule selection cannot be changed by said first entity thereafter.

22. The method of claim 21, further comprising the step of:
  removing from said first entity any control over when said periodic repayment will be received by said first entity after said schedule selection.

23. The method of claim 22, further comprising the step of:
  removing from said first entity any power to demand or collect proceeds of said contingent installment obligation from said second entity.

24. The method of claim 22 wherein said fourth entity is based and does business outside the United States.

25. The method of claim 23 wherein said disposable property comprises payments from a lottery.

26. The method of claim 23 wherein said disposable property comprises payments from a structured settlement.

27. The method of claim 23 wherein said disposable property comprises payments from a business asset sale, said assets including qualifying stock and other evidence of business ownership but excluding marketable securities.

28. The method of claim 23 wherein said disposable property comprises future life insurance benefits.

29. The method of claim 23 wherein said disposable property comprises payments resulting from guaranteed provisions of a professional athlete's compensation contract.

30. The method of claim 23 wherein said disposable property comprises payments resulting from a deferred compensation provision of an employee compensation contract.

31. The method of claim 23 wherein said disposable property comprises payments resulting from a guaranteed payment provision in a contract.

32. The method of claim 23 wherein said disposable property comprises the sale of a tangible asset wherein an economic gain results.

33. The method of claim 23 wherein said disposable property comprises the sale of an intangible asset wherein an economic gain results.

34. A computer system, comprising:
  logic to determine an initial principal amount of a first entity's disposable property for assigning said disposable property to a second entity wherein said initial principal amount is equated from a discounted present value of said disposable property;
  logic to generate a portfolio of financial securities from a database of financial securities for said first entity to select one or more of said financial securities for investment of said initial principal amount;
  logic to instruct an investment manager to establish an investment portfolio with said initial principal amount according to said first entity's selection of said financial securities;
  logic to track said investment portfolio and to generate notification to said first entity of the financial performance of said investment portfolio; and
  logic to direct payment to said first entity at periodic intervals based on the financial performance of said investment portfolio in satisfaction of said contingent installment note.

35. The system of claim 34, further comprising:
  logic to configure said discounted present value based upon a prevailing interest rate and a cost of funds interest rate.

36. The system of claim 35, further comprising:
  logic to electronically detect and implement changes in said prevailing interest rate.

37. The system of claim 34, further comprising:

logic to track changes in said investment portfolio made by said first entity;

logic to instruct said investment manager to implement said changes in said investment portfolio.

38. The system of claim 37, further comprising:

logic to track payments made to said first entity in satisfaction of said contingent installment note and;

logic to direct payment of a lump sum value of said investment portfolio when a final payment for said contingent installment note is due.

39. The system of claim 34, further comprising:

logic to create and maintain a state table that includes a list of all states having lottery games; and logic to create and maintain a prize options table that includes a list of all lottery games offered by states in said state table and current terms and conditions for said lottery games.

40. The system of claim 39, further comprising:

logic to create and maintain a database of lottery winners including said lottery winner's name, address, amount of lottery prize, date of receipt of prize, conditions of receipt of payment, and state of lottery game.

41. The system of claim 40, further comprising:

logic to configure said discounted present value based on a future stream of payments from said lottery prize.

42. The system of claim 34, further comprising:

logic to track and store a historical rate of return for each financial security stored on said database of financial securities.

43. The system of claim 42, further comprising:

logic to configure a projected yield table for said portfolio of financial securities based on said historical rate of return for each financial security selected by said first entity.

44. The system of claim 43, further comprising:

logic to configure a future cash flow payable to said first entity based on said projected yield table.

45. The system of claim 44, further comprising:

a computer to execute said computer system.

46. A computer readable medium for execution in a computer, comprising:

logic to determine an initial principal amount of a first entity's disposable property for assigning said disposable property to a second entity wherein said initial principal amount is equated from a discounted present value of said disposable property;

logic to generate a portfolio of financial securities from a database of financial securities for said first entity to select one or more of said financial securities for investment of said initial principal amount;

logic to instruct an investment manager to establish an investment portfolio with said initial principal amount according to said first entity's selection of said financial securities;

logic to track said investment portfolio and to generate notification to said first entity of the financial performance of said investment portfolio; and logic to direct payment to said first entity at periodic intervals based on the financial performance of said investment portfolio in satisfaction of a contingent installment note.

\* \* \* \* \*